(12) United States Patent
Barber

(10) Patent No.: US 11,293,741 B2
(45) Date of Patent: Apr. 5, 2022

(54) SIZING TOOL

(71) Applicant: THE BOEING COMPANY, Chicago, IL (US)

(72) Inventor: Aaron Robert Barber, Renton, WA (US)

(*) Notice: Subject to any disclaimer, the term of this patent is extended or adjusted under 35 U.S.C. 154(b) by 425 days.

(21) Appl. No.: 16/537,405

(22) Filed: Aug. 9, 2019

(65) Prior Publication Data
US 2021/0041216 A1 Feb. 11, 2021

(51) Int. Cl.
| | | |
|---|---|---|
| B43L 7/10 | (2006.01) | |
| G01B 5/02 | (2006.01) | |
| G01B 5/24 | (2006.01) | |
| G05B 19/4097 | (2006.01) | |
| B25B 23/00 | (2006.01) | |
| B25B 13/48 | (2006.01) | |

(52) U.S. Cl.
CPC .............. *G01B 5/02* (2013.01); *G01B 5/24* (2013.01); *G05B 19/4097* (2013.01); *B25B 13/481* (2013.01); *B25B 23/0035* (2013.01); *G05B 2219/35043* (2013.01); *G05B 2219/35134* (2013.01)

(58) Field of Classification Search
CPC ........................................................ B43L 7/10
USPC .................. 33/452, 454, 456, 464, 465, 201
See application file for complete search history.

(56) References Cited

U.S. PATENT DOCUMENTS

| | | | | |
|---|---|---|---|---|
| 1,831,693 | A * | 11/1931 | Trotter ...................... | B43L 7/10 33/420 |
| 4,352,247 | A * | 10/1982 | Rohde ...................... | B43L 7/10 33/428 |
| 4,827,625 | A * | 5/1989 | Le Moal ............ | A47G 27/0487 33/527 |
| 6,195,903 | B1 * | 3/2001 | Inglehart .................. | B25H 7/02 33/32.1 |
| 7,469,485 | B1 * | 12/2008 | Perdue ...................... | B43L 7/10 33/454 |
| 8,782,914 | B1 * | 7/2014 | DeLuca ..................... | B43L 7/10 33/458 |
| 9,021,713 | B1 * | 5/2015 | Pierson ..................... | B43L 7/10 33/529 |
| 2001/0052189 | A1 * | 12/2001 | Kreisler .................... | B43L 7/10 33/473 |
| 2004/0181955 | A1 * | 9/2004 | Sargent ..................... | B43L 7/10 33/473 |
| 2005/0115091 | A1 * | 6/2005 | Harris ....................... | B43L 7/10 33/461 |
| 2007/0022856 | A1 * | 2/2007 | Paine ................... | E04F 21/0069 83/522.11 |
| 2008/0034599 | A1 * | 2/2008 | Hamilton ................. | B25H 7/00 33/471 |

(Continued)

*Primary Examiner* — George B Bennett
(74) *Attorney, Agent, or Firm* — Womble Bond Dickinson (US) LLP

(57) ABSTRACT

A tool for sizing a workspace includes a first link with a link body and a tool element. The tool includes a second link connected to the first link, where the second link is capable of rotation or translation with respect to the first link, and where the first link and the second link are selectively securable relative to each other. The tool includes a third link connected to the second link, where the third link is capable of rotation or translation with respect to the second link, and where the second link and the third link are selectively securable relative to each other.

20 Claims, 13 Drawing Sheets

(56) References Cited

U.S. PATENT DOCUMENTS

| | | | | |
|---|---|---|---|---|
| 2014/0373372 A1* | 12/2014 | Flippo | ............... | B43L 7/10 33/418 |
| 2015/0292855 A1* | 10/2015 | Rao | ............... | E04F 21/0076 33/526 |
| 2019/0225009 A1* | 7/2019 | Hummel | ............... | B43L 7/12 |

* cited by examiner

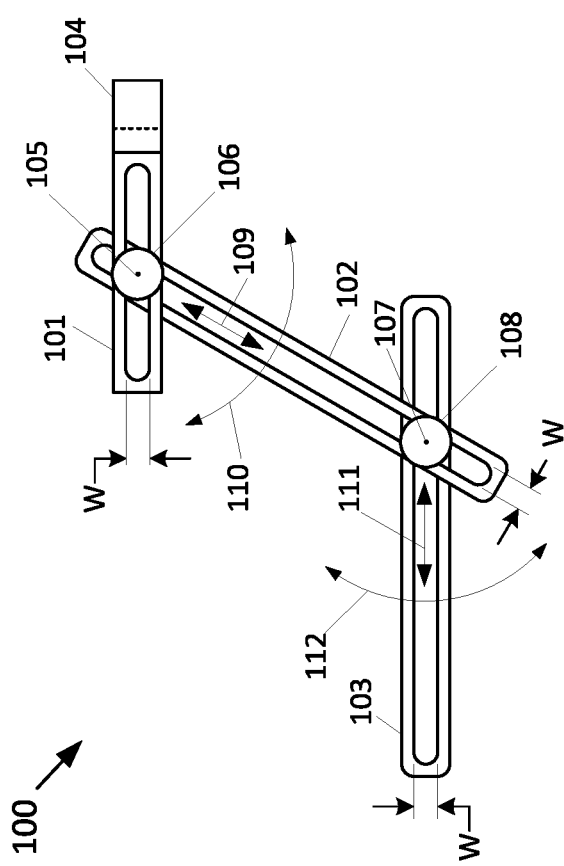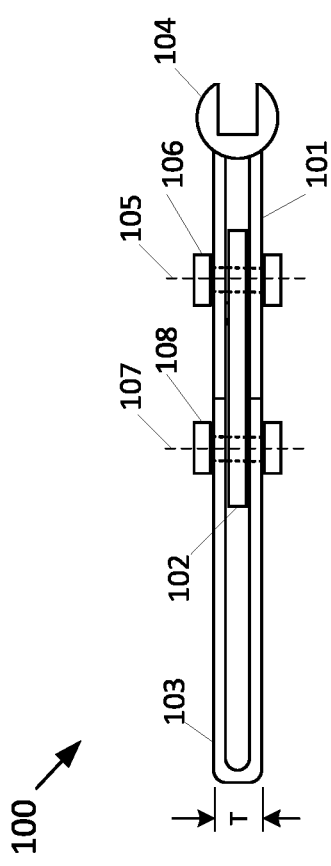
FIG. 1
FIG. 2

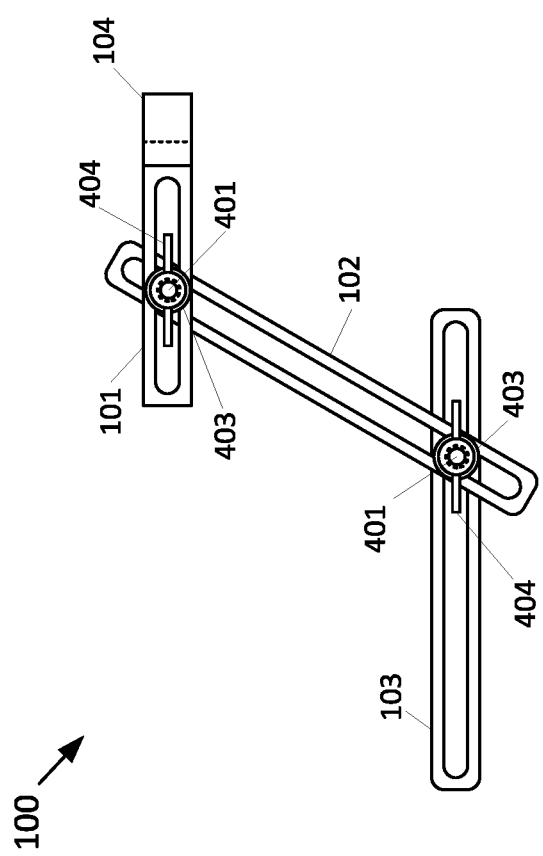
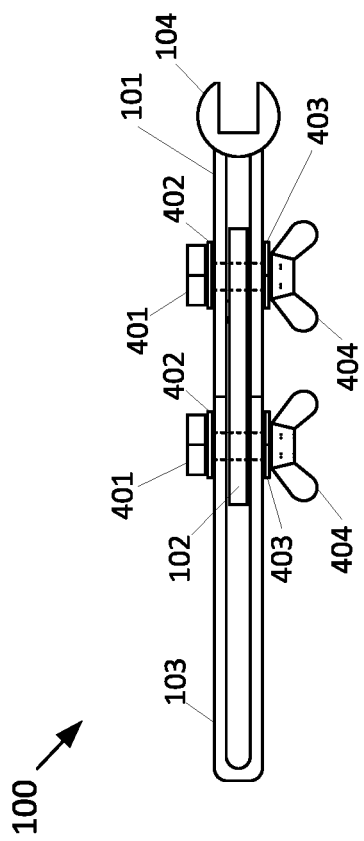
FIG. 5
FIG. 6

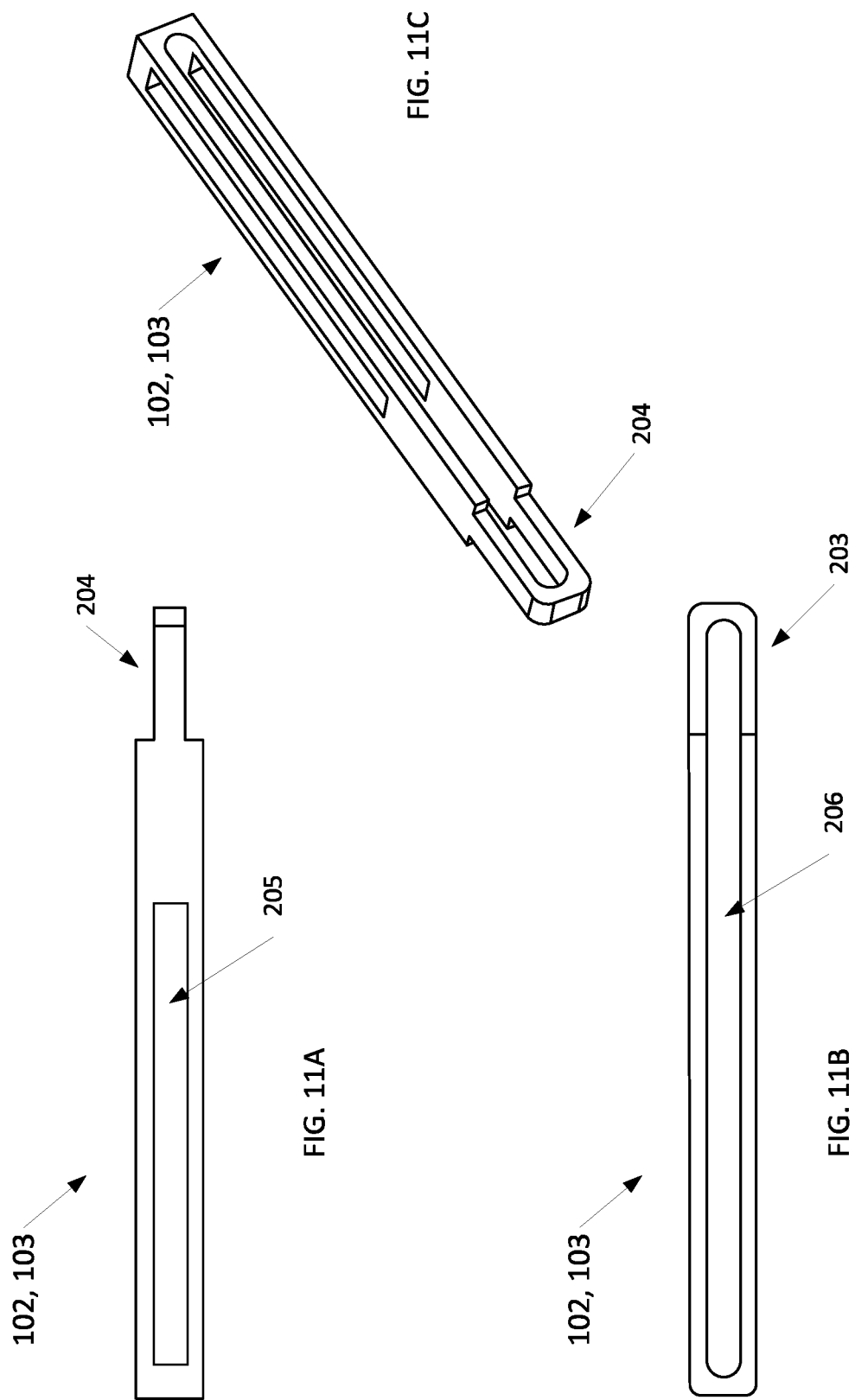

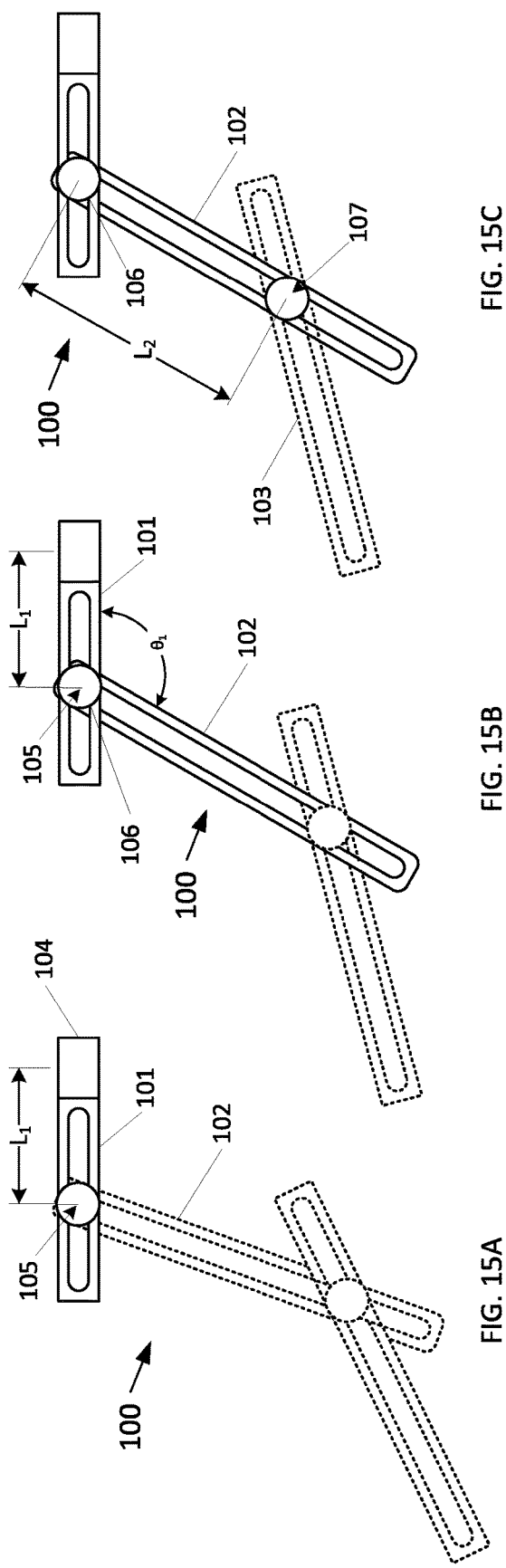
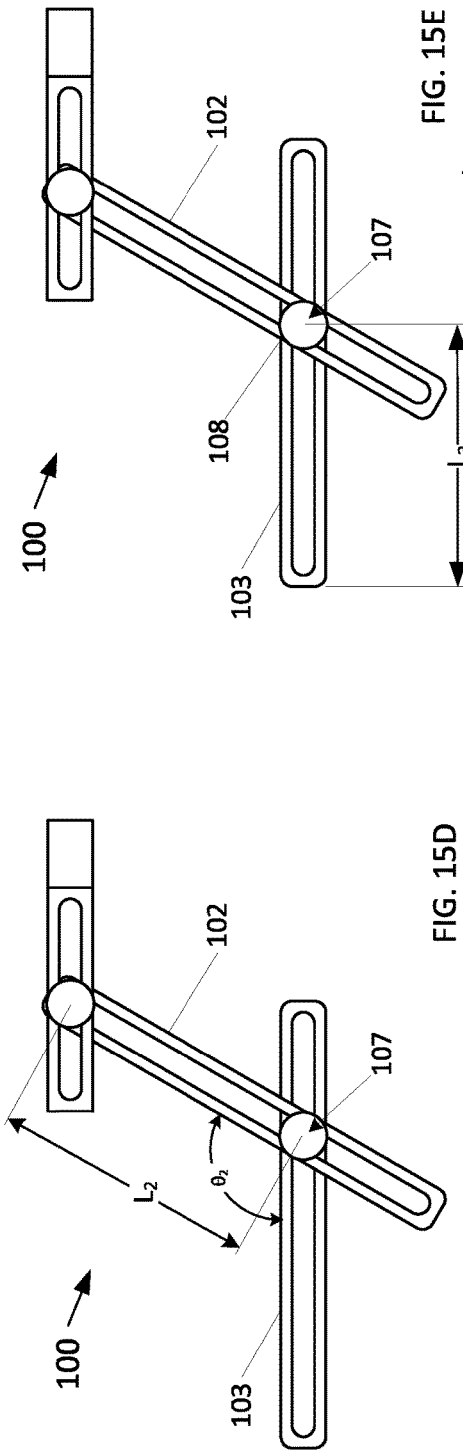

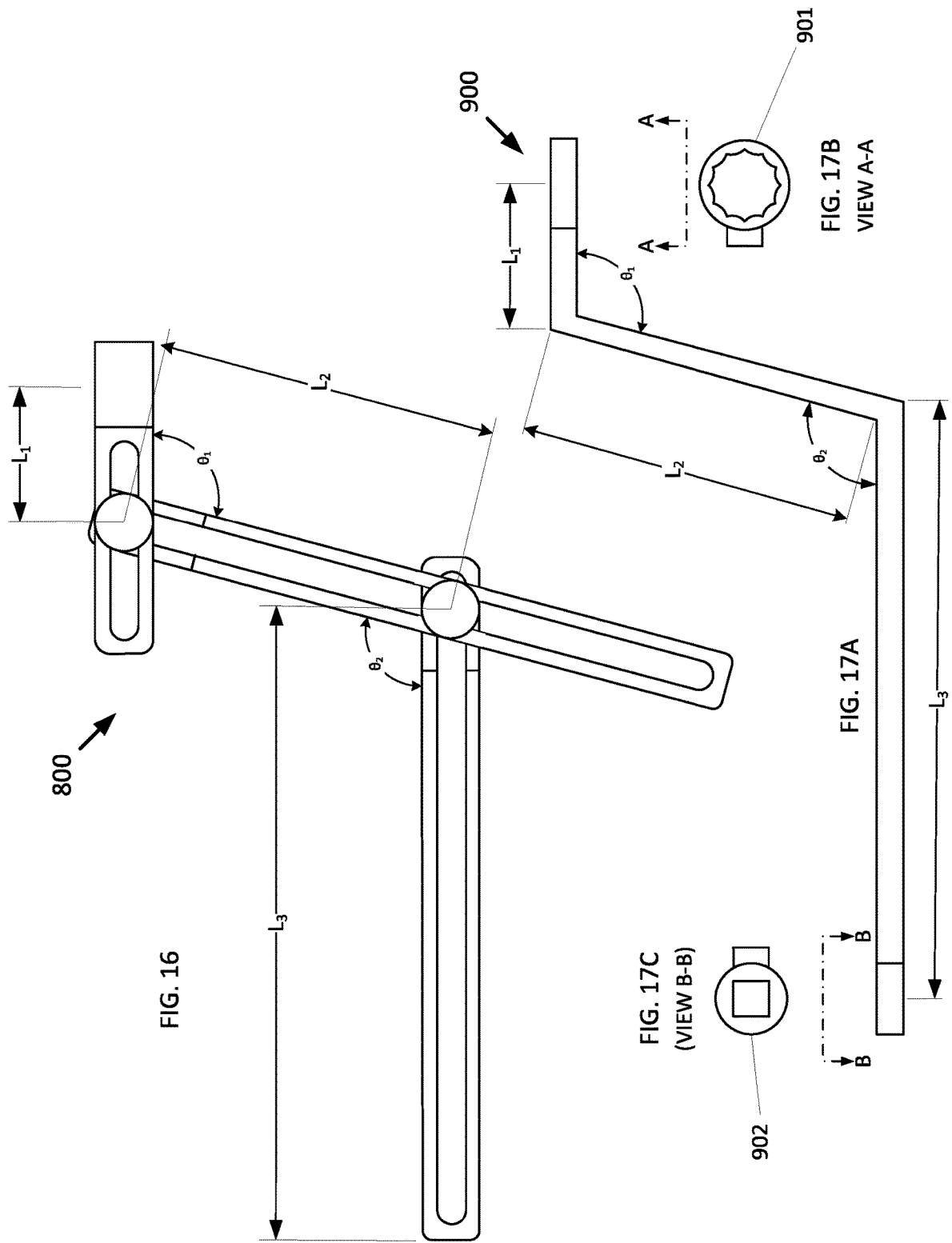

SIZING TOOL

FIELD

The present disclosure is related to tool design and more particularly to a design aide to customize tools for use in constrained workspaces.

BACKGROUND

In large assembly environments, such as aircraft assembly, shipbuilding and automotive assembly, for example, workspaces can be constrained in a way that limits or prevents the use of standard, off the shelf tools. One approach to this problem is to use measurement tools (e.g., tape measures and protractors) to estimate the lengths and angles of tool segments needed for a tool with offsets that fit the workspace. However, this approach is prone to errors and can require several iterations to refine the design, increasing the time and cost of producing a useable tool.

SUMMARY

Examples in the present disclosure include methods and apparatus for providing a template for a manufactured tool for a target workspace.

In one example, an apparatus to provide a template for a manufactured tool ("a sizing tool") includes a first link, a second link and a third link, where the first link includes a tool element. The second link is connected to the first link in a manner that allows the second link to pivot or slide relative to the first link, such that the second link is capable of rotation and translation with respect to the first link, and where the first link and the second link are selectively securable relative to each other. The third link is connected to the second link in a manner that allows the third link to pivot or slide relative to the second link, such that the third link is capable of rotation and translation with respect to the second link, and where the second link and the third link are selectively securable relative to each other.

In one example, a method to provide a template for a manufactured tool, using a sizing tool with a first link, a second link and a third link includes engaging a fastener in a target workspace with a tool head of the first link, setting an effective length of the first link by adjusting the location on the first link of a pivot point between the first link and the second link, setting an angle between the first link and the second link by rotating the second link with respect to the first link at the pivot point between the first link and the second link to establish a first tool offset, setting an effective length of the second link by adjusting the location on the second link of a pivot point between the second link and the third link, setting an angle between the second link and the third link by rotating the third link with respect to the second link at the pivot point between the second link and the third link to establish a second tool offset, and setting an effective length of the third link by adjusting the location on the third link of the pivot point between the second link and the third link.

In one example, the method also includes securing the second link to the first link with a first fastener, and securing the third link to the second link with a second fastener.

In one example, the method also includes entering the effective lengths of the first, second and third links, and the angles between the first and second links and the second and third links, into a computer-aided design/computer-aided manufacturing (CAD/CAM) system, and fabricating a tool with custom offsets for the target workspace. In one example, the sizing tool may be used directly in a manufacturing environment.

The foregoing examples can be achieved independently in various examples or be combined in yet other examples, further details of which can be seen with reference to the following description and drawings.

BRIEF DESCRIPTION OF THE DRAWINGS

For a more complete understanding of various examples, reference is now made to the following detailed description taken in connection with the accompanying drawings in which like identifiers correspond to like elements:

FIG. 1 illustrates a side view of an example of a sizing tool;

FIG. 2 illustrates a top view of the example sizing tool of FIG. 1;

FIG. 5 illustrates the sizing tool of FIG. 1 with the fastener of FIG. 4;

FIG. 6 illustrates the sizing tool of FIG. 2 with the fastener of FIG. 4;

FIGS. 11A-11C illustrate an example of a second link and third link of a sizing tool according to the present disclosure;

FIGS. 15A-15E illustrate a sequence of operations corresponding to the operations of the flowchart of FIG. 14;

FIG. 16 illustrates an example sizing tool according to the present disclosure;

FIGS. 17A-17C illustrate an example of a manufactured tool based on the sizing tool of FIG. 16;

DETAILED DESCRIPTION

Figure 4:
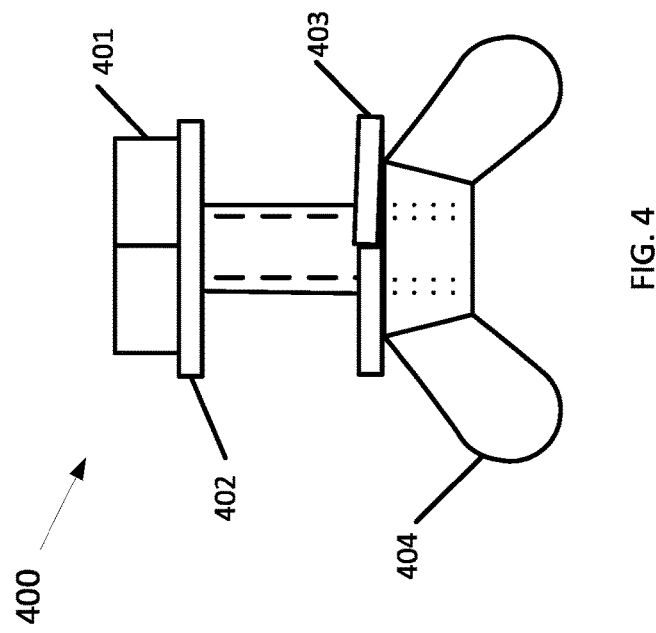
FIG. 4 illustrates another example of a fastener.

The present disclosure describes examples of apparatus and methods for providing a template for a manufacturing tool using a sizing tool with adjustable links to customize the sizing tool to a target workspace ("workspace"), where standard, off-the-shelf tools are constrained by the workspace and rendered inefficient or unusable.

Examples of the present disclosure provide an adjustable sizing aide for determining the design requirements of a manufacturing tool customized for the workspace. By using multiple, adjustable links, the sizing aide can directly determine offset locations, lengths and angles that are needed for a manufacturing tool that is customized for the workspace, rather than using physical measurements of lengths and angles, which are prone to error.

FIG. 1 and FIG. 2 illustrate, respectively, side and top views of an example sizing tool 100. In the example illustrated in FIG. 1, sizing tool 100 includes three interconnected segments ("links"); a first link 101 including a tool element 104, a second link 102 and a third link 103. In the example of FIGS. 1 and 2, tool element 104 is shown as a flat wrench head configured to engage a nut or bolt such as a hex nut or hex bolt, for example. In other examples, the tool element may be, for example, and without limitation, a socket wrench, a Phillips screwdriver, a flat screwdriver, an Allen wrench or a star wrench.

As illustrated in FIGS. 1 and 2, the second link 102 is connected to the first link 101 at an adjustable first pivot point 105 that allows the second link 102 to slide through or pivot around pivot point 105, where the second link 102 is capable of translation (indicated by line 109) or translation (indicated by arc 110) with respect to the first link 101. In one example, the relative positions of the first link 101 and the second link 102 may be selectively securable at pivot point 105 by a clamping or locking element 106.

As illustrated in FIGS. 1 and 2, the third link 103 is connected to the second link 102 at an adjustable second pivot point 107 that allows the third link 103 to slide through or pivot around pivot point 107, where the third link 103 is capable of translation (indicated by line 111) or rotation (indicated by arc 112) with respect to the second link 102. In one example, the relative positions of the second link 102 and the third link 103 may be selectively securable at pivot point 107 by a clamping or locking element 108

In some examples, links 101, 102 and 103 of sizing tool 100 may be fabricated using additive manufacturing techniques, such as three dimensional (3D) printing or injection molding, for example. Plastic such as ABS (Acrylonitrile Butadiene Styrene), PLA (polylactic acid), PET (polyethylene terephthalate), PC (polycarbonate), PP (polypropylene), polyamides and the like can be used to produce sizing tools quickly and at low cost. Alternatively, 3D printing with laser-sintered metals, such as steel and brass, for example, could be used to produce an adjustable tool that could also be used as a durable working tool.

Figure 3:
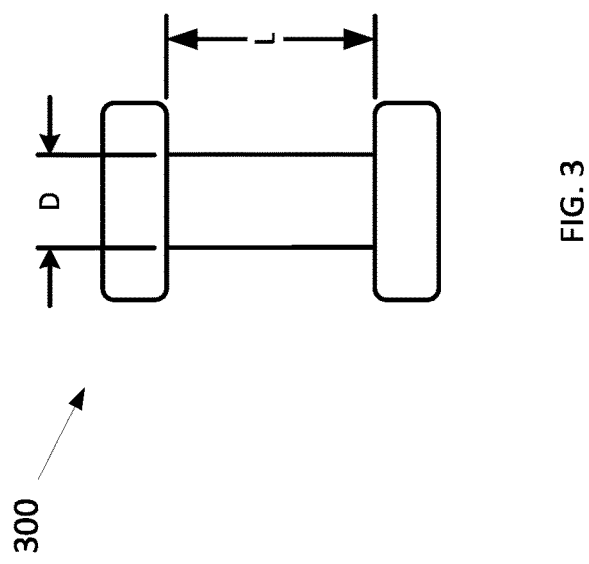
FIG. 3 illustrates an example of a fastener.

Clamping/locking elements 106 and 108 may be any kind of suitable fastener to secure the positions of links 101, 102 and 103 after their positions have been selected to fit the target workspace, as described in detail below. In one example, as illustrated by FIG. 3, the fasteners 106 and 108 could be an elastomeric fastener 300 with an unstretched length "L" that is less than a thickness "T" of link 101 and link 103, and a diameter D that is greater than a slot width "W" in any of the links 101, 102 and 103. When fitted in place after being deformed to fit through the slots in links 101, 102 and 103, the elastomeric fasteners would then exert a compressive force on the outer facing surfaces of the tool, and frictional forces on the interior surfaces of the slots to resist both rotation and translation. In one example, as illustrated by FIG. 4, the fasteners 106 and 108 could be a nut and bolt assembly 400 including a bolt 401, a washer 402, a lock washer 403 and a wingnut 404, for example. FIG. 5 and FIG. 6 illustrate the example sizing tool 100 configured with fasteners 400, where all other elements are the same.

Figure 8:
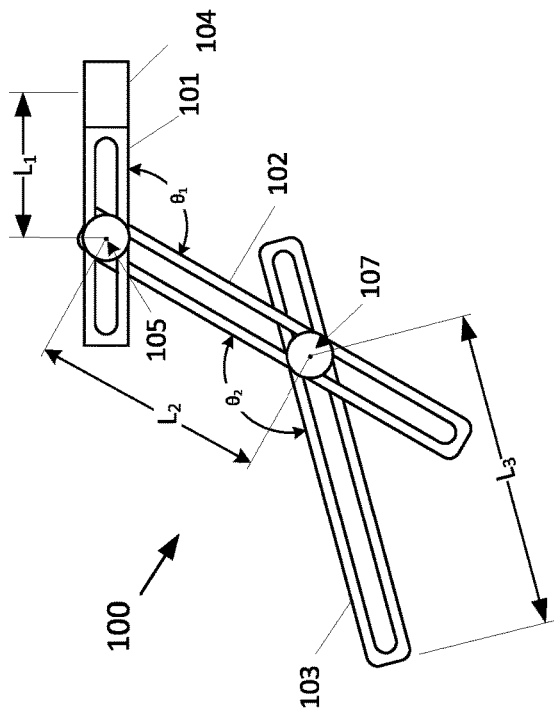
FIGS. 7-9 illustrate examples of various configurations of a sizing tool.
Figure 7:
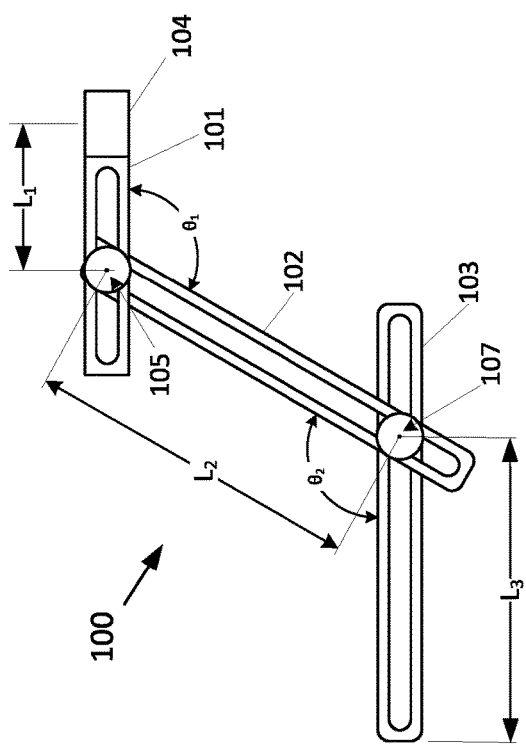
Figure 9:
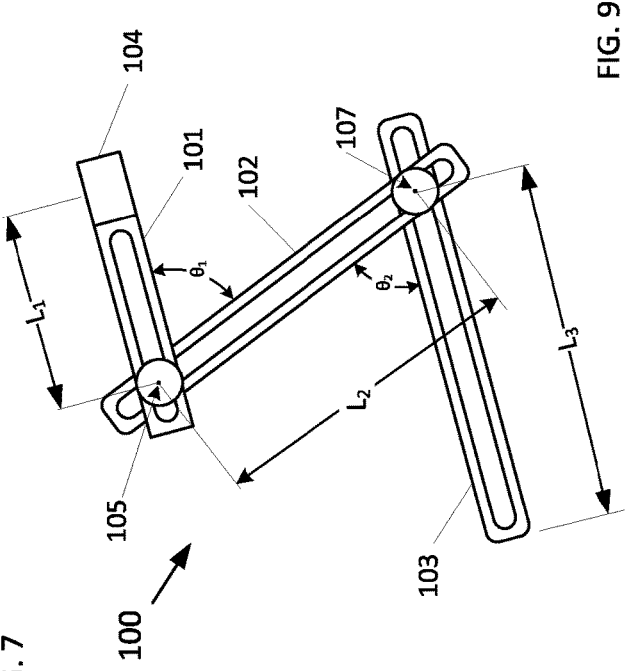

FIG. 7, FIG. 8 and FIG. 9 illustrate examples, without limitation, of different physical configurations that example sizing tool 100 might be adjusted to in order to fit in three different hypothetical workspaces. In each of the FIGS. 7, 8 and 9, $L_1$ is the effective length of link 101 as the length between pivot point 105 and the centerline of tool head 104; $\theta_1$ is the angle between link 101 and link 102; $L_2$ is the effective length of link 102 between pivot point 105 and pivot point 107; $\theta2$ is the angle between link 102 and link 103; and $L_3$ is the effective length of link 103 between pivot point 107 and the end of link 103.

Figure 10C:
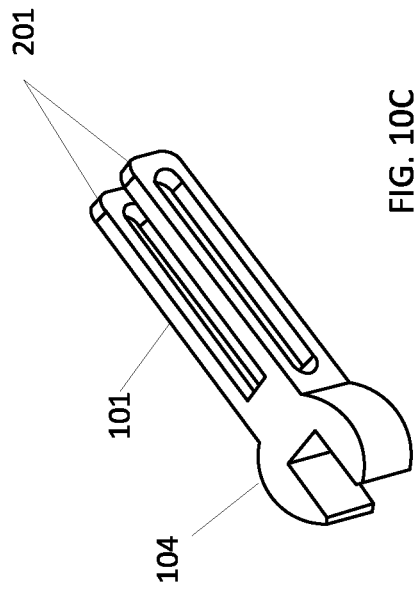
FIGS. 10A-10C illustrate an example of a first link of a sizing tool according to the present disclosure.
Figure 10A:
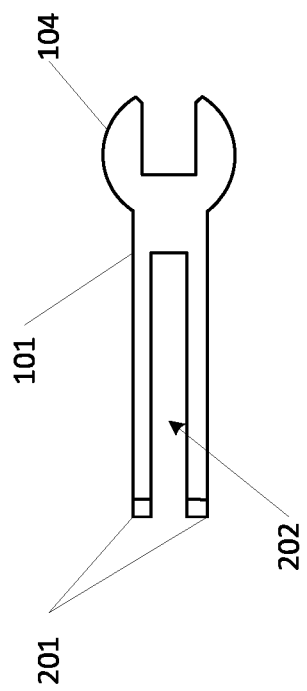
Figure 10B:
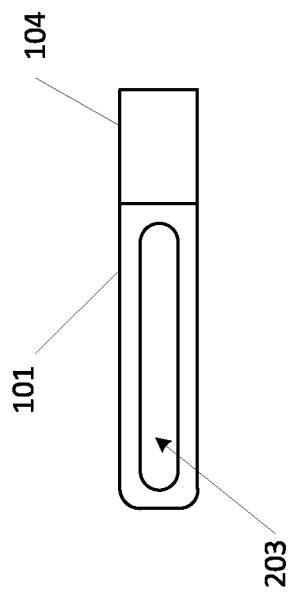

An example of link 101 with integral tool head 104 is illustrated in FIGS. 10A, 10B and 10C, where FIG. 10A is a top view, FIG. 10B is a side view, and FIG. 10C is an isometric view. As illustrated in FIGS. 10A and 10C, example link 101 includes two "tines" 201 with a space between for the insertion of a second link in a first plane (out of the page in FIG. 10A). As illustrated in FIGS. 10B and 10C, each tine 201 has a slot 203 for the insertion of a second link in a second plane (out of the page in FIG. 10B).

An example of links 102 and 103 with a common design is illustrated in FIGS. 11A, 11B and 11c, where FIG. 11A is a top view, FIG. 11B is a side view and FIG. 11C is an isometric view. As illustrated in FIGS. 11A, 11B and 11C, Link 102/103 includes a "neck" portion 204 for insertion into the tines 201 or slot 202 of link 101. Example link 102/103 also includes slots 205 and 206 in two perpendicular planes for the insertion of another similar link as illustrated in FIGS. 11A and 11B.

Figure 12:
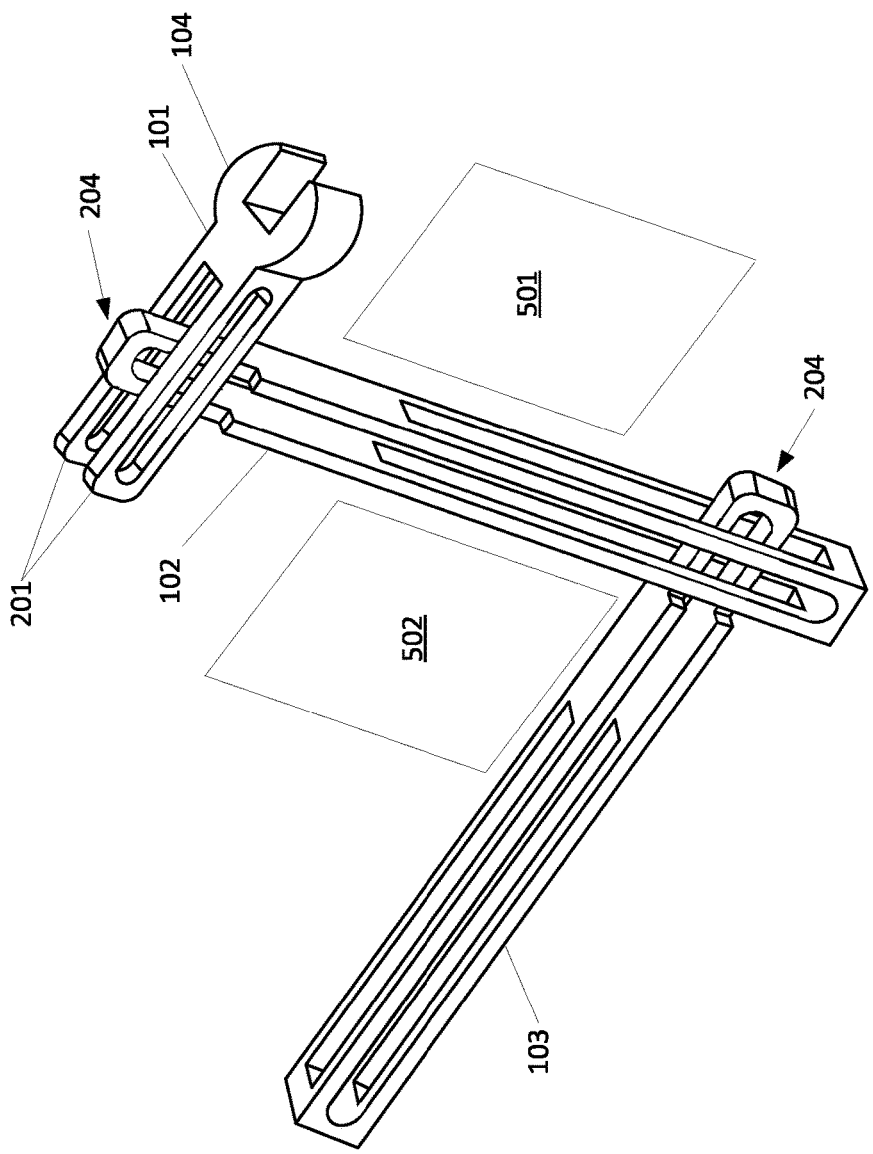
FIG. 12 illustrates an isometric view of a co-planar configuration of an example sizing tool according to the present disclosure.

FIG. 12 is an isometric view of an example sizing tool 500. Sizing tool 500 is shown without fasteners 106 and 108 for better clarity. In this example, link 101, 102 and 103 are assembled in a coplanar configuration, where link 101 and link 102 define a first plane of rotation 501 and link 102 and link 103 define a second plane of rotation 502 parallel to the first plane 501.

Figure 13:
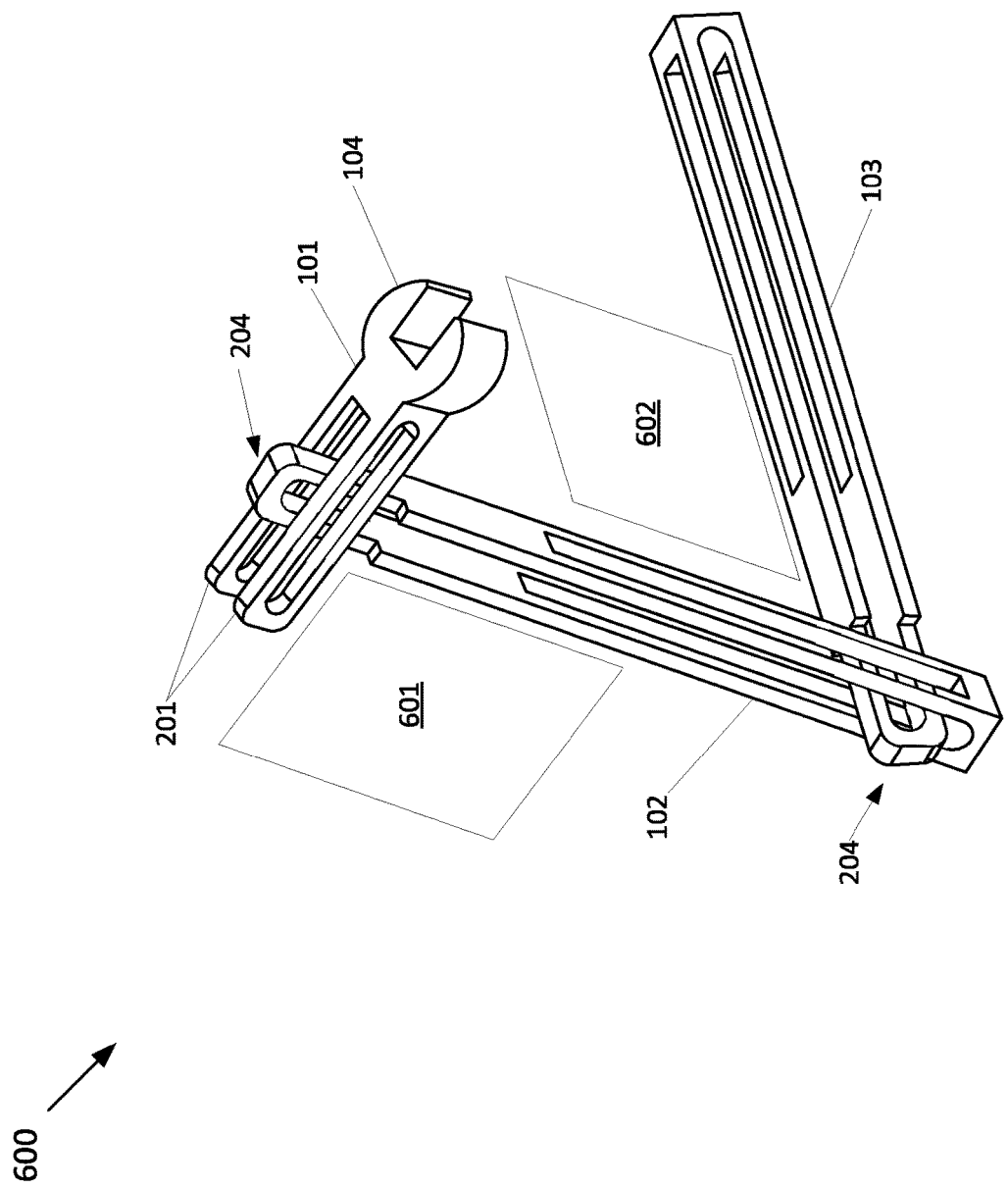
FIG. 13 illustrates an isometric view of an orthogonal-plane configuration of an example sizing tool according to the present disclosure.

FIG. 13 is an isometric view of an example sizing tool 600. Sizing tool 600 is shown without fasteners 106 and 108 for better clarity. In this example, link 101, 102 and 103 are assembled in an orthogonal configuration, where link 101 and link 102 define a first plane of rotation 601 and link 102 and link 103 define a second plane of rotation 602, perpendicular (orthogonal) to the first plane 601.

Figure 14:
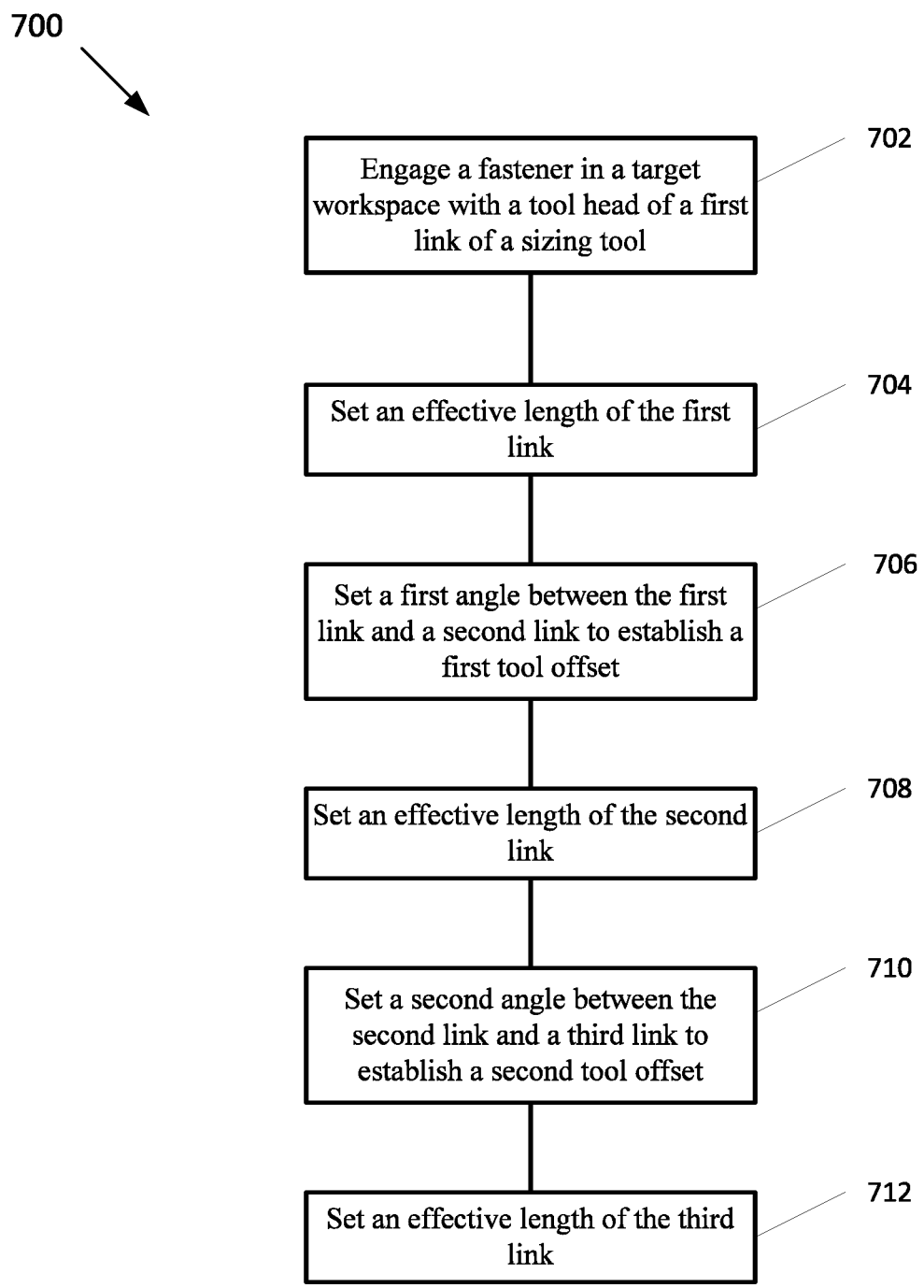
FIG. 14 is a flowchart illustrating a method for fitting a sizing tool to a target workspace in one example.

FIG. 14 is a flowchart illustrating an example method 700 for fitting a sizing tool to a target workspace. FIGS. 15A-15E illustrate a sequence of operations on example sizing tool 100 corresponding to the method 700. Method 700 begins with operation 702 (not shown in FIG. 15), engaging a fastener in a target workspace with tool head (e.g., tool head 104) of a first link (e.g., link 101) of the sizing tool (e.g., sizing tool 100).

Method 700 continues at operation 704 (see FIG. 15A), setting an effective length of the first link (e.g., length $L_1$ of link 101). In one example, setting the effective length of the first link includes adjusting a location on the first link of a first pivot point (e.g., pivot point 105) between the first link and a second link (e.g., link 102).

Method 700 continues at operation 706 (see FIG. 15B), setting a first angle (e.g., angle $\theta_1$) between the first link and the second link to establish a first tool offset defined by the effective length of the first link (e.g., $L_1$) and the angle between the first link and the second link (e.g., $\theta_1$). In one example, setting the first angle between the first link and the second link includes rotating the second link with respect to the first link at the first pivot point between the first link and the second link. In one example, operation 706 further includes securing the first link to the second link at the first pivot point with a first fastener (e.g., fastener 106).

Method 700 continues at operation 708 (see FIG. 15C), setting an effective length of the second link (e.g., length $L_2$). In one example, setting the effective length of the second link includes adjusting a location on the second link of a second pivot point (e.g., pivot point 107) between the second link and a third link (e.g., link 103).

Method 700 continues at operation 710 (see FIG. 15D), setting a second angle (e.g., angle $\theta_2$) between the second link and the third link to establish a second tool offset defined by the effective length of the second link (e.g., $L_2$) and the angle between the second link and the third link (e.g., $\theta_2$). In one example, setting the second angle between the second link and the third link includes rotating the third link with respect to the second link at the second pivot point between the second link and the third link.

Method 700 continues at operation 712 (see FIG. 15E), setting an effective length of the third link (e.g., length $L_3$ of link 103). In one example, setting the effective length of the third link includes adjusting a location on the third link of the second pivot point (e.g., pivot point 107) between the second link and a third link. In one example, operation 712 further includes securing the second link to the third link at the second pivot point with a second fastener (e.g., fastener 108).

FIG. 16 illustrates an example sizing tool 800, similar in all respects to example sizing tool 100, described above, the details of which shall not be repeated here. Sizing tool 800, having been fitted to a target workspace, is characterized by effective length $L_1$, first angle $\theta_1$, effective length $L_2$, second angle $\theta_2$, and effective length $L_3$, as described above with respect to example sizing tool 100.

FIG. 17A is a manufactured tool 900 based on the sizing tool 800. As can be seen from FIG. 17A, manufacturing tool 900 is also characterized by effective length $L_1$, first angle $\theta_1$, effective length $L_2$, second angle $\theta_2$, and effective length $L_3$. As described below, manufacturing tool 900 may be produced by a CAD/CAM (computer-aided design/computer-aided manufacturing) system that can further customize the manufacturing tool 900 for the target workspace. For example, and without limitation, FIG. 17B illustrates in view A-A of FIG. 17A, that the tool element of sizing tool 900 (corresponding to tool element 104 of sizing tool 100) may be fabricated as a 12-point wrench head 901 to provide extra degrees of freedom for engaging a fastener in the workspace. In another example, FIG. 17C illustrates in view B-B of FIG. 17A, that the proximal end of manufacturing tool 900 may be fabricated to receive the drive element (e.g., a square drive in the example of FIG. 17C) of another tool, such as a torque wrench, for example, to apply a calibrated torque to the fastener in the workspace.

Figure 18:
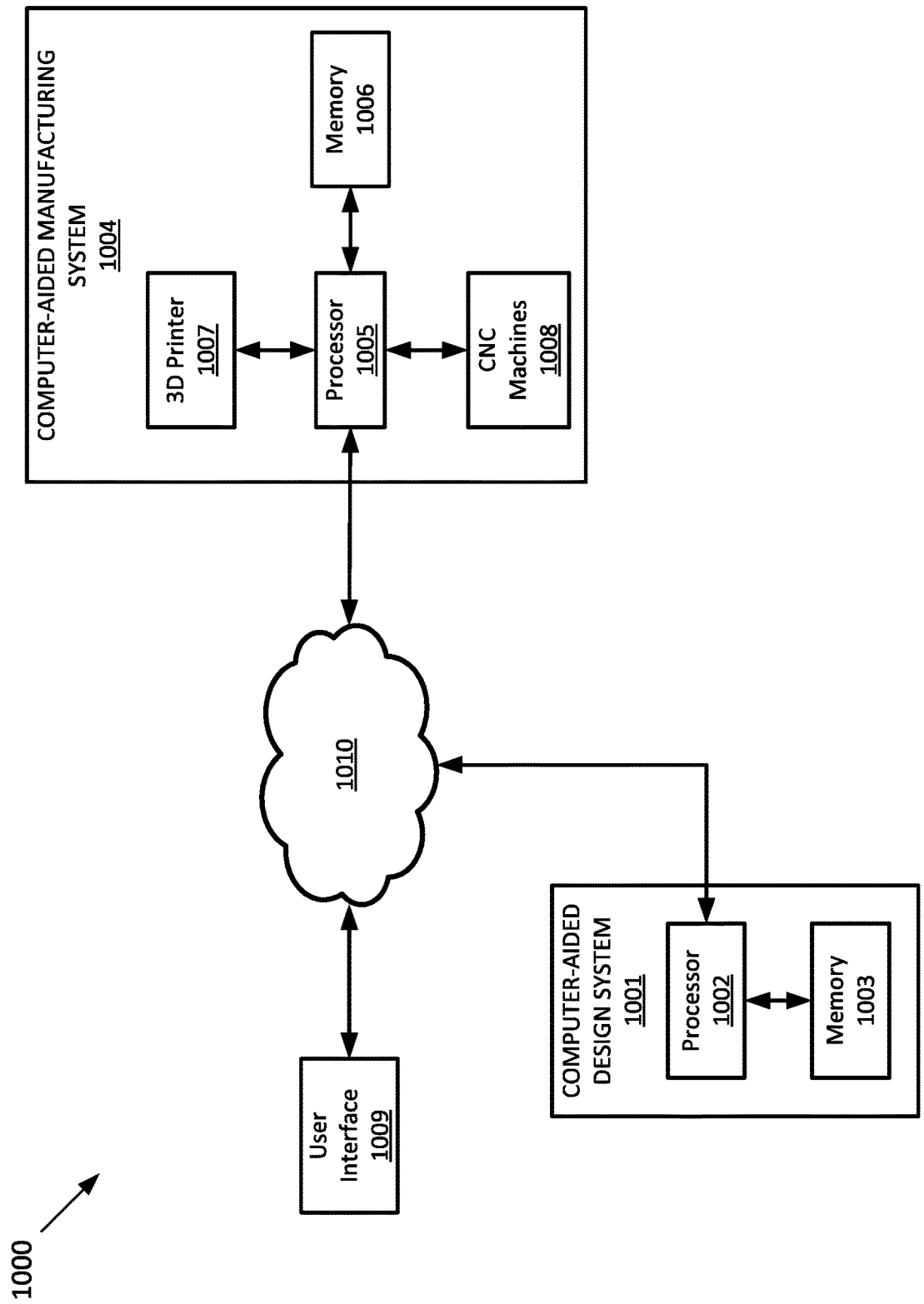
FIG. 18 is a block diagram illustrating an example system for fabricating a sizing tool.

FIG. 18 is a block diagram illustrating an example CAD/CAM (computer-aided design/computer-aided manufacturing) system 1000, suitable for producing both sizing tools, such as sizing tool 800, and manufacturing tools, such as manufacturing tool 900. In one example, system 1000 includes a computer-aided design (CAD) system 1001 that may be capable of 3D modeling, simulation and analysis. CAD system 1001 includes a processor 1002, which may be any type of general purpose or special purpose processor, or multiple processors, suitable for computer aided design. CAD system 1001 also includes a memory 1003 to store CAD programs for execution by processor 1002, and to store data files generated by the CAD programs. Memory 1003 may be any type of non-transitory computer-readable medium capable of storing data and instructions that can be read and executed by processor 1002, such as random access memory (RAM), read only memory (ROM), flash memory, and programmable read only memory (PROM), for example.

In one example, system 1000 includes a computer-aided manufacturing (CAM) system 1004 configured to manufacture sizing tools, such as sizing tool 800, and manufacturing tools, such as manufacturing tool 900, from data files generated by the CAD programs. CAM system 1004 includes a processor 1005, to receive CAD data from CAD system 1001, to convert the CAD data to CAM files stored in a local memory 1006, and to execute the CAM files on computerized manufacturing systems, such as 3D printer 1007 and CNC (computer numerical control) machines 1008, such as computer controlled milling machines and lathes, for example. Memory 1006 may be any type of non-transitory computer-readable medium capable of storing data and instructions that can be read and executed by processor 1005, such as random access memory (RAM), read only memory (ROM), flash memory, and programmable read only memory (PROM), for example.

System 1000 may also include a user interface 1009 to receive user input in the form of commands and data for design and manufacturing. User interface 1009, CAD system 1001 and CAM system 1004 may be interconnected by network 1010. Network 1010 may be, for example and without limitation, a wired or wireless local area network (LAN), a wide area network (WAN), a metropolitan area network (MAN), an intranet or the Internet.

Figure 19:
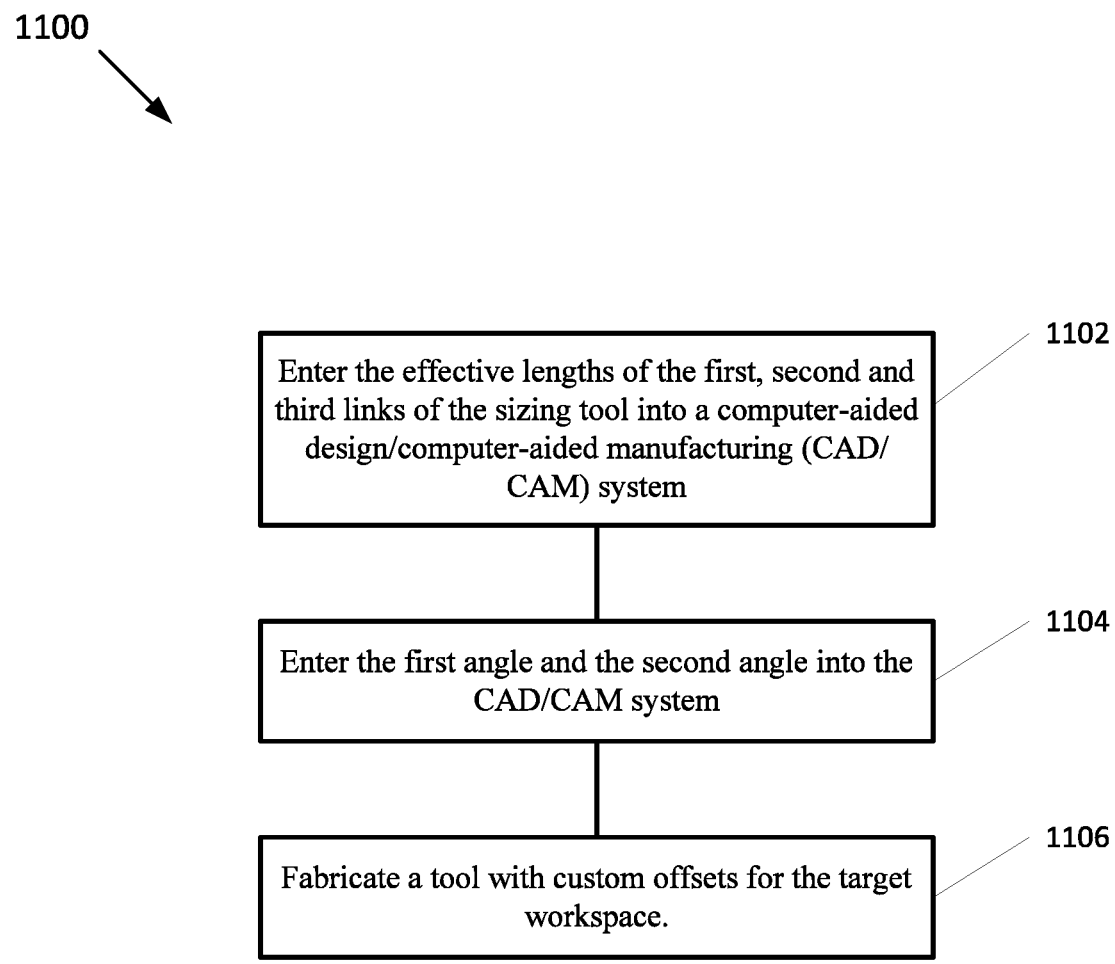
FIG. 19 is a flowchart illustrating a method for manufacturing a custom tool in one example.

FIG. 19 is a flowchart illustrating an example method 1100 for manufacturing a customized tool for a target workspace (with respect to FIGS. 16 and 17A). Method 1100 begins at operation 1102, where the effective lengths $L_1$, $L_2$ and $L_3$ of the sizing tool 800 are entered into the CAD/CAM system 1000 at the user interface 1009 of system 1000. Method 1100 continues at operation 1104, where the first angle $\theta_1$ and the second angle $\theta_2$ are entered into the CAD/CAM system 1000 at the user interface 1009 of system 1000. Method 1100 concludes with operation 1106, where the manufacturing tool 900 is fabricated with custom offsets for the target workspace.

The preceding description sets forth numerous specific details such as examples of specific systems, components, methods, and so forth, in order to provide a thorough understanding of several examples in the present disclosure. It will be apparent to one skilled in the art that at least some examples in the present disclosure may be practiced without these specific details. In other instances, well-known components or methods are not described in detail or are presented in simple block diagram form in order to avoid unnecessarily obscuring the present disclosure. Thus, the specific details set forth are merely exemplary. While this specification contains many specific implementation details, these should not be construed as limitations on the scope of the disclosure or of what may be claimed, but rather as descriptions of features specific to particular examples. Certain features that are described in this specification in the context of separate examples can also be implemented in combination in a single example. Conversely, various features that are described in the context of a single example can also be implemented in multiple examples separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Moreover, the separation of various system components in the examples described above should not be understood as requiring such separation in all examples. Particular examples may vary from these exemplary details and still be contemplated to be within the scope of the present disclosure.

Reference throughout this specification to "one example" or "an example" means that a particular feature, structure, or characteristic described in connection with the examples is included in at least one example. Thus, the appearances of the phrase "in one example" or "in an example" in various places throughout this specification are not necessarily all referring to the same example. In addition, the term "or" is intended to mean an inclusive "or" rather than an exclusive "or." In addition, the articles "a" and "an" as used in this application and the appended claims should generally be construed to mean "one or more" unless specified otherwise or clear from context to be directed to a singular form. Furthermore, the terms "first," "second," "third," etc., as used herein, are meant as labels to distinguish among different elements and may not necessarily have an ordinal meaning according to their numerical designation.

Although the operations of the methods herein are shown and described in a particular order, the order of the operations of each method may be altered so that certain operations may be performed in an inverse order or so that certain operation may be performed, at least in part, concurrently with other operations. In another example, instructions or sub-operations of distinct operations may be in an intermittent or alternating manner.

The above description of illustrated implementations, including what is described in the Abstract, is not intended to be exhaustive or to limit the scope of the disclosure to the precise forms disclosed. While specific implementations and examples are described herein for illustrative purposes, various equivalent modifications are possible within the scope of the present disclosure, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion.

What is claimed is:

1. An apparatus, comprising:
a first link comprising a link body and a tool element;
a second link connected to the first link at least one of pivotally or slidingly, wherein the second link is capable of at least one of rotation or translation with respect to the first link, wherein the first link and the second link are selectively securable relative to each other; and
a third link connected to the second link at least one of pivotally or slidingly, wherein the third link is capable of at least one of rotation or translation with respect to the second link, wherein the second link and the third link are selectively securable relative to each other.

2. The apparatus of claim 1, wherein the first, second and third links are configured to provide a template for a manufactured tool with custom offset angles and offset lengths for a target assembly environment.

3. The apparatus of claim 1, further comprising:
a first fastener at a first pivot point between the first link and the second link to selectively secure a position of the first link relative to the second link; and
a second fastener at a second pivot point between the second link and the third link to selectively secure a position of the second link relative to the third link.

4. The apparatus of claim 3, wherein the first fastener and the second fastener each comprise one of a clamping device and a locking assembly.

5. The apparatus of claim 4, wherein the clamping device comprises and elastomeric clamp.

6. The apparatus of claim 4, wherein the locking assembly comprises a nut and bolt assembly.

7. The apparatus of claim 1, wherein the first and second links define a first plane of rotation and translation and the second and third links define a second plane of rotation and translation.

8. The apparatus of claim 7, wherein the second plane is different from the first plane.

9. The apparatus of claim 1, wherein the first link, the second link and the third link are produced with one of an additive manufacturing process and a subtractive manufacturing process.

10. The apparatus of claim 1, wherein the first, second and third links are configured to provide a tool with adjustable offset angles and offset lengths for a plurality of target assembly environments.

11. A method, comprising:
in a sizing tool comprising a plurality of links,
engaging a fastener in a target workspace with a tool head of a first link of the sizing tool;
setting an effective length of the first link;
setting a first angle between the first link and a second link to establish a first tool offset;
setting an effective length of the second link;
setting a second angle between the second link and a third link to establish a second tool offset; and
setting an effective length of the third link.

12. The method of claim 11, wherein
setting the effective length of the first link comprises adjusting a location on the first link of a first pivot point between the first link and the second link;
setting the effective length of the second link comprises adjusting a location on the second link of a second pivot point between the second link and the third link; and
setting the effective length of the third link comprises adjusting a location on the third link of the second pivot point.

13. The method of claim 12, wherein
setting the first angle between the first link and the second link comprises rotating the second link with respect to the first link at the first pivot point between the first link and the second link; and
setting the second angle between the second link and the third link comprises rotating the third link with respect to the second link at the second pivot point between the second link and the third link.

14. The method of claim 12, further comprising:
securing the first link to the second link at the first pivot point with a first fastener; and
securing the second link to the third link at the second pivot point with a second fastener.

15. The method of claim 14, wherein the first fastener and the second fastener each comprise one of a clamping device and a locking assembly.

16. The method of claim 11, wherein the first and second links define a first plane and the second and third links define a second plane.

17. The method of claim 16, wherein the second plane is different from the first plane.

18. The method of claim 10, further comprising:
entering the effective lengths of the first, second and third links into a computer-aided design/computer-aided manufacturing (CAD/CAM) system;
entering the first angle and the second angle into the CAD/CAM system; and
fabricating a tool with custom offsets for the target workspace.

19. A non-transitory, computer-readable medium containing data, and instructions therein that, when executed by a processor, cause the processor to perform operations using the data, comprising:
  entering the effective lengths of a sizing tool into a computer-aided design/computer-aided manufacturing (CAD/CAM) system;
  entering the offset angles of the sizing tool into the CAD/CAM system; and
  fabricating a tool with custom offsets for a target workspace.

20. The computer-readable medium of claim 19, wherein fabricating the tool comprises one of three-dimensional printing the tool and machining the tool.

* * * * *